United States Patent
Watanabe

(10) Patent No.: US 11,150,852 B2
(45) Date of Patent: Oct. 19, 2021

(54) INFORMATION PROCESSING APPARATUS THAT CHANGES A SETTING VALUE FOR A PART WORKFLOW BASED ON EDITING OF WORKFLOW FOR A DIFFERENT PART, WORKFLOW EDITING METHOD, AND MEDIUM

(71) Applicant: CANON KABUSHIKI KAISHA, Tokyo (JP)

(72) Inventor: Tomoaki Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/553,527

(22) Filed: Aug. 28, 2019

(65) Prior Publication Data

US 2020/0081675 A1    Mar. 12, 2020

(30) Foreign Application Priority Data

Sep. 11, 2018  (JP) .............................. JP2018-169976

(51) Int. Cl.
*G06F 3/12*    (2006.01)
*H04N 1/00*    (2006.01)

(52) U.S. Cl.
CPC .......... *G06F 3/1275* (2013.01); *G06F 3/1204* (2013.01); *G06F 3/1274* (2013.01); *H04N 1/00411* (2013.01)

(58) Field of Classification Search
None
See application file for complete search history.

(56) References Cited

U.S. PATENT DOCUMENTS

| | | | |
|---|---|---|---|
| 9,792,079 B2 | 10/2017 | Smyth et al. | |
| 2011/0181900 A1* | 7/2011 | Suese | H04N 1/0074 358/1.13 |
| 2013/0222857 A1* | 8/2013 | Nobushima | G06F 3/1208 358/1.18 |
| 2014/0240754 A1* | 8/2014 | Smyth | G06F 3/1204 358/1.15 |
| 2015/0212854 A1* | 7/2015 | Tsukuda | G06F 3/1253 718/102 |
| 2019/0079797 A1* | 3/2019 | Hori | G06F 3/04817 |

FOREIGN PATENT DOCUMENTS

JP    2014-164765 A    9/2014

* cited by examiner

*Primary Examiner* — Andrew H Lam
(74) *Attorney, Agent, or Firm* — Venable LLP

(57) ABSTRACT

According to the present invention, an information processing apparatus for editing workflow information is provided that defines a procedure for combining pieces of part information with each other to create a product, the part information defining parts. The information processing apparatus is configured to change, for each part, settings of the part included in the part information, according to an operation; and adjust settings of another part that is to be combined with the part, according to a change that has been made to the settings of the part.

14 Claims, 12 Drawing Sheets

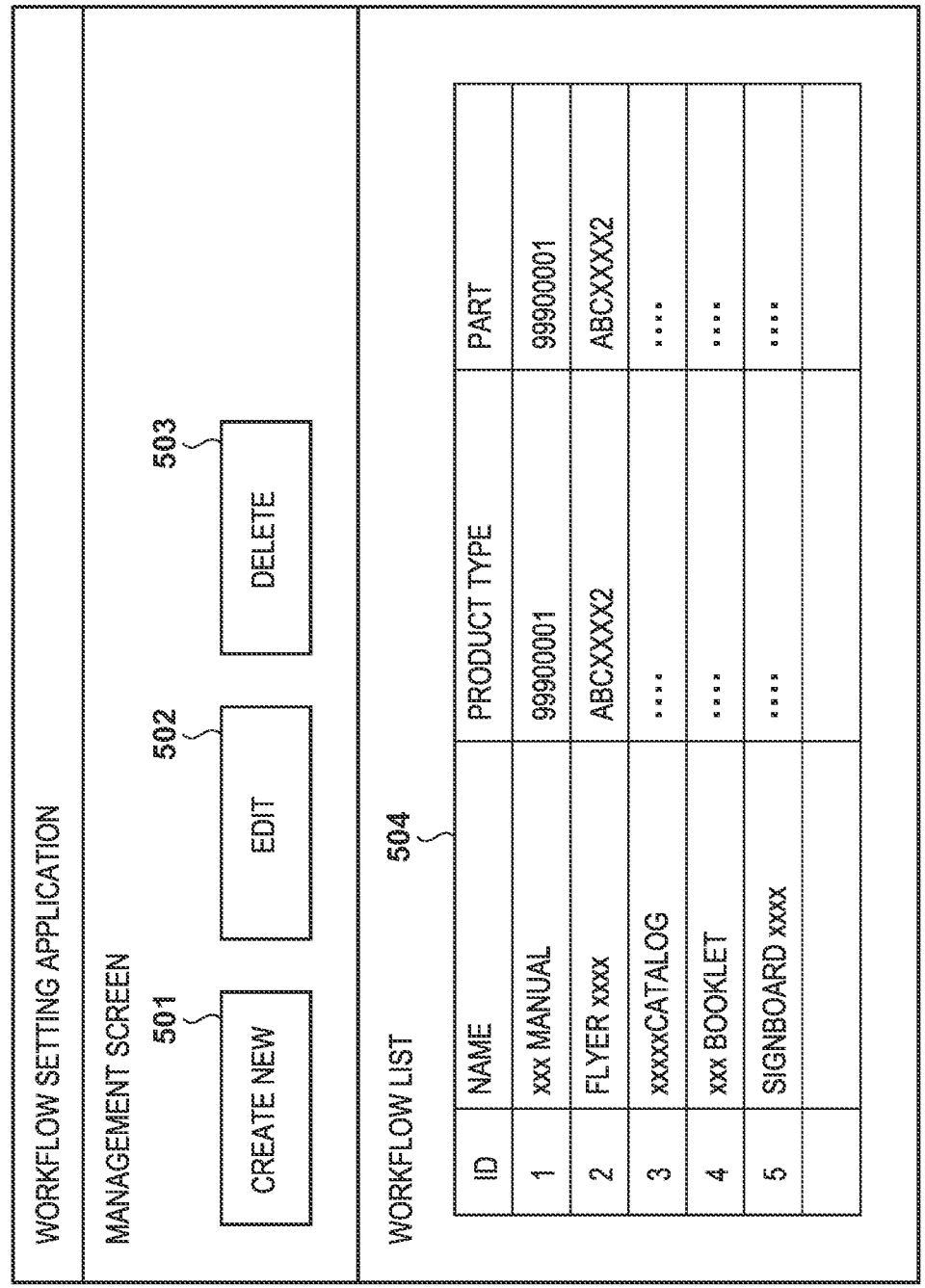

INFORMATION PROCESSING APPARATUS THAT CHANGES A SETTING VALUE FOR A PART WORKFLOW BASED ON EDITING OF WORKFLOW FOR A DIFFERENT PART, WORKFLOW EDITING METHOD, AND MEDIUM

BACKGROUND OF THE INVENTION

Field of the Invention

The present invention relates to an information processing apparatus, a workflow editing method and a medium, and particularly to editing of a workflow for creating a commercial material in the field of commercial printing, for example.

Description of the Related Art

In recent years, in the field of POD (Print on Demand), print workflow automation has been realized in order to realize a short delivery time. In workflow automation, in order to manufacture printed commercial materials (e.g. books, flyers, or business cards), required parts (e.g. a cover, a body, a title page, and a wrapper band) and processes (e.g. imposition, barcode attachment, printing, folding, perfect binding, and three-sided trimming) that are required for each part are set in advance. Thereafter, when an order is received, jobs are automatically generated for each process based on the settings of the process that have been determined in advance, and such jobs are transmitted to a printing machine or a post-processing machine. With the print workflow software disclosed in Japanese Patent Laid-Open No. 2014-164765, it is possible to set a workflow by freely connecting icons that represent processes to each other on a graphical user interface (GUI).

With a method through which processes are selected one by one and the setting values of each step are edited, such as the method employed by the print workflow software disclosed in Japanese Patent Laid-Open No. 2014-164765, it is possible to perform accurate setting. However, with such a method, there is a problem in that it takes time and effort to perform setting. For example, in the case of a book-related printed commercial material (i.e. the finished product is a book), after determining the trim size of the body, it is necessary to calculate the trim size of the cover and set it on the workflow software, considering the trim size and thickness of the body. Furthermore, if a configuration for attaching a jacket and a wrapper band to the cover is employed, it is necessary to similarly calculate and set the trim sizes of the jacket and the wrapper band with reference to the size of the cover.

Also, if the settings of a process need to be modified after the settings of a workflow have been completed, it is necessary to modify the settings of processes for other parts as well according to the setting change. For example, if the width of the body in terms of the trim size is increased, the widths of the cover, the jacket, and the wrapper band in terms of their trim sizes also need to be modified according to the change.

SUMMARY OF THE INVENTION

The present invention reduces a load on a worker when the worker sets a workflow so as to improve a work efficiency and prevent a mistake from occurring.

The present invention has the following configuration. That is to say, according to the first aspect of the present invention, there is provided an information processing apparatus for editing workflow information that defines a procedure for combining pieces of part information with each other to create a product, the part information defining parts, the information processing apparatus comprising: a setting change unit configure to change, for each part, settings of the part included in the part information, according to an operation; and an adjustment unit configure to adjust settings of another part that is to be combined with the part, according to a change that has been made to the settings of the part.

According to the second aspect of the present invention, there is provided a workflow editing method for editing workflow information that defines a procedure for combining pieces of part information with each other to create a product, the part information defining parts, the workflow editing method comprising: changing, for each part, settings of the part included in the part information, according to an operation; and adjusting settings of another part that is to be combined with the part, according to a change that has been made to the settings of the part.

According to the third aspect of the present invention, there is provided a non-transitory computer-readable storage medium in which a program is stored, the program causing a computer to execute a workflow editing method for editing workflow information that defines a procedure for combining pieces of part information with each other to create a product, the part information defining parts, the workflow editing method comprising: changing, for each part, settings of the part included in the part information, according to an operation; and adjusting settings of another part that is to be combined with the part, according to a change that has been made to the settings of the part.

According to the present invention, it is possible to reduce a load on a worker when the worker sets a workflow so as to improve a work efficiency and prevent a mistake from occurring.

Further features of the present invention will become apparent from the following description of exemplary embodiments with reference to the attached drawings.

BRIEF DESCRIPTION OF THE DRAWINGS

FIG. 5 is a diagram showing an example of a workflow management screen of a workflow setting application.

DESCRIPTION OF THE EMBODIMENTS

The following describes embodiments of the present invention with reference to the drawings. The embodiments describe a print workflow used for Print on Demand (on-demand printing), and, in particular, editing of the print workflow.

First Embodiment

The present embodiment describes an example of setting of the trim size of each part when a manufacturing workflow for a book with a jacket is created. In the present description, a process through which a cover and the body are glued to each other using a bookbinding machine is referred to as a bookbinding process, and a process through which a title page is attached to the outside of the body before gluing is performed is referred to as an insertion process. A process through which a bound book, which has undergone gluing, is wrapped with a jacket and a wrapper band, and a part to be folded is manually folded, is referred to as a wrapping process. The bookbinding process, the insertion process, and the wrapping process are collectively referred to as combining processes, which are processes through which two or more parts are combined with each other. The following description includes the term "finishing size". Generally, "finishing size" refers to the size of a finished product (e.g. the size of a book), or the trim size of each part (e.g. the size of sheets that have been trimmed). In the present description, the term "finishing size" refers to the trim size of each part. A workflow that is to be created or edited is information, and may also be referred to as workflow information or workflow data. Similarly, parts are defined using pieces of information or data indicating the parts, which may also be referred to as part information or part data.

System Configuration

Figure 1:
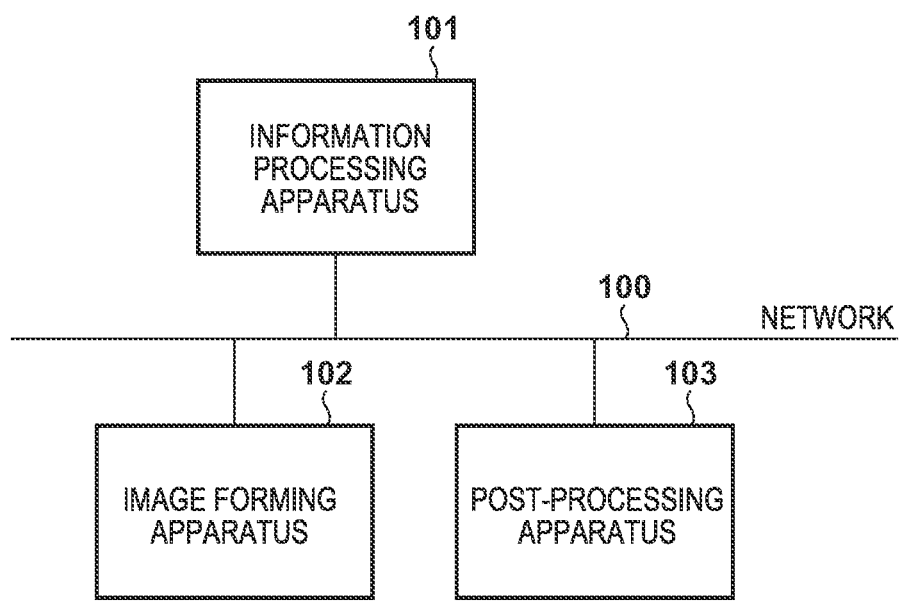
FIG. 1 is a diagram showing a system configuration according to the present invention.

FIG. 1 is a diagram showing a system configuration according to an embodiment of the present invention. A system according to the present embodiment includes an information processing apparatus 101, an image forming apparatus 102, and a post-processing apparatus 103. The information processing apparatus 101, the image forming apparatus 102, and the post-processing apparatus 103 are connected to each other via a network 100 so as to be able to communicate with each other. The image forming apparatus 102 analyzes print data transmitted from the information processing apparatus 101 and so on, converts the print data to dot images for each page, and prints the dot images. A printed matter output from the image forming apparatus 102 is hand-carried by an operator and is passed to the post-processing apparatus 103, or is passed to the post-processing apparatus 103 via a conveyor belt (not shown). The post-processing apparatus 103 can communicate with the image forming apparatus 102 and the information processing apparatus 101 via the network 100. The post-processing apparatus 103 performs processing, such as trimming, creasing, folding, and perfect binding, on a printed matter passed thereto. It is possible to use a plurality of post-processing apparatuses to perform bookbinding and thereafter perform book trimming Although FIG. 1 shows an example in which one information processing apparatus 101, one image forming apparatus 102, and one post-processing apparatus 103 are provided, any number of apparatuses may be provided. For example, printed matters output from a plurality of image forming apparatuses may be processed by a plurality of post-processing apparatuses 103. Also, the post-processing apparatuses may include a post-processing apparatus that is only used to input information indicating that work has been completed. For example, in the wrapping process with a jacket, which is subsequent to perfect binding, a jacket is manually attached to a book that has undergone perfect binding, and information indicating that work has been completed is input from a post-processing apparatus.

A workflow is created by the information processing apparatus 101. Thereafter, jobs are created based on the workflow, for each part and each process that constitute the workflow, and the jobs are transmitted to apparatuses that execute the jobs. If the content (settings) of a job is dependent on the preceding process, the job may be created after the process has been completed. For example, the first process for many parts is printing. After printing is performed, each of such parts is cut, and the parts are combined with each other through binding, insertion, wrapping, and so on. In such a case, if an operator wishes to subsequently cut a targeted semi-finished product that has undergone the printing process (such a product is referred to as a printed matter), the operator brings the printed matter to a cutting apparatus, which is one of the post-processing apparatuses, according to the workflow. Thereafter, the operator specifies a job for the printed matter, which has been transmitted from the information processing apparatus 101 to the post-processing apparatus 103 according to the workflow, to cause the post-processing apparatus 103 to execute the job. Such a job includes setting values required for the printed matter, indicating the cutting size and the side to be cut, for example, and cutting is performed according to the settings. Jobs are specified using job IDs, for example, and the operator is informed of the job IDs in advance. The same applies to other post-processing processes, and the operator can manufacture a finished product by proceeding with work according to the workflow.

Hardware

Figure 2:
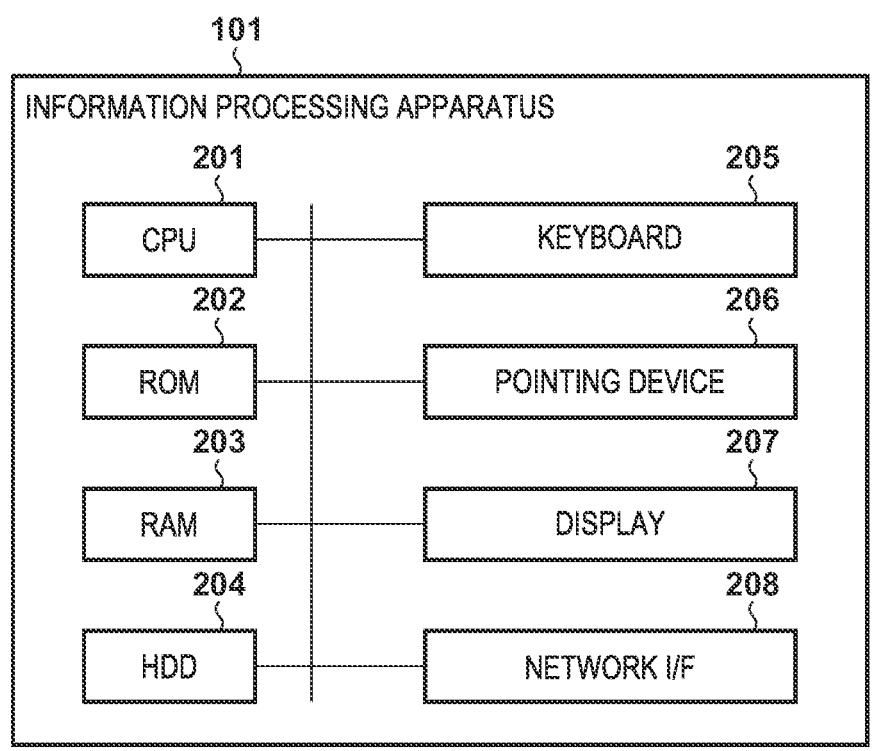
FIG. 2 is a diagram showing a hardware configuration of an information processing apparatus according to the present invention.

FIG. 2 is a diagram showing a hardware configuration of the information processing apparatus 101. A CPU 201 reads out control programs that are stored in a ROM 202 to execute various kinds of control processing. A RAM 203 is used as a main memory and a temporary storage area such as a working area for the CPU 201. An HDD 204 stores image data and various programs. A keyboard 205 is an input device, which is instruction input means, and is used to input a control command or a text to an application according to the present invention. The application will be described below. A pointing device 206 is an input device, which is instruction input means as with the keyboard 205, and is used to input a control command to the application according to the present invention described below. A display 207 is an output device, which is display means, and displays commands input from the keyboard 205 or the pointing device 206, the state of the application according to the present invention described below, and so on. A network I/F 208 connects the information processing apparatus 101 to a network (such as a local area network or the Internet). The information processing apparatus 101 uses the network I/F 208 to transmit and receive various kinds of information to and from other apparatuses on the network. The respective control units of the image forming apparatus 102 and the post-processing apparatus 103 may also have substantially the same configuration as that shown in FIG. 2. However, each apparatus has a processing unit that is adapted to processing (processes) that is to be executed by the apparatus.

Software

Figure 3:
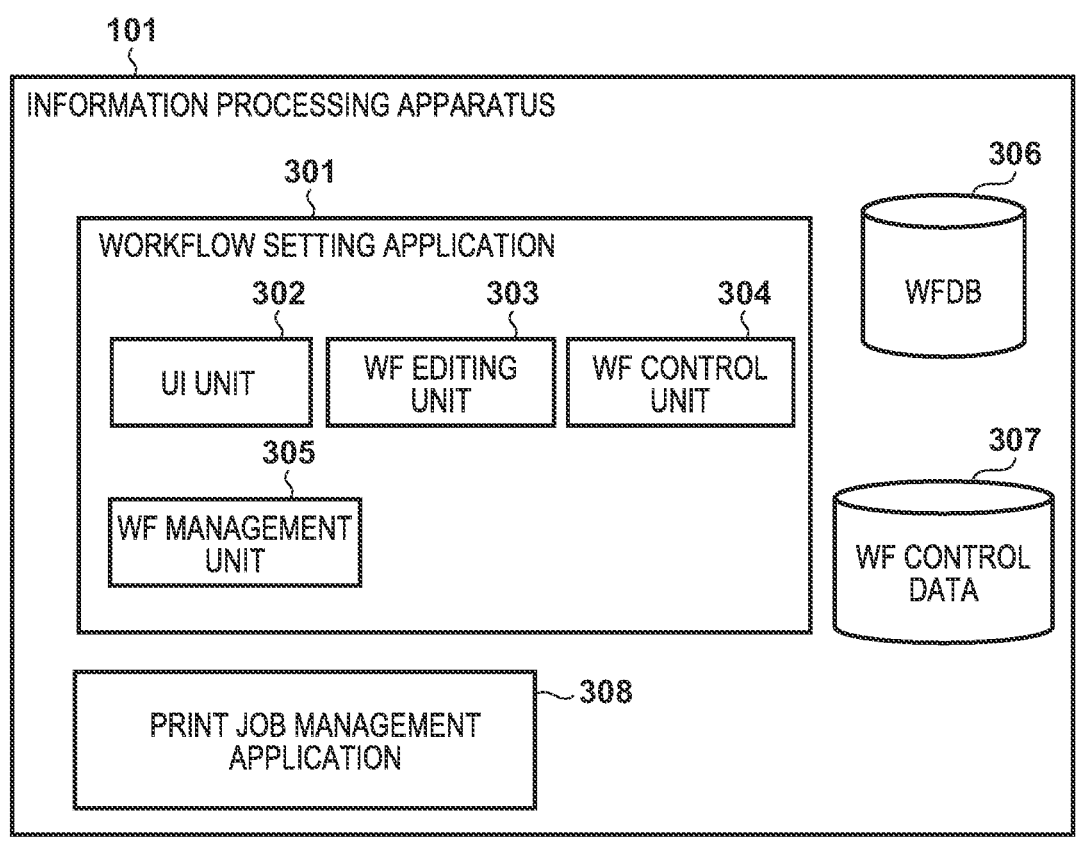
FIG. 3 is a diagram showing a software configuration according to the present invention.

FIG. 3 is a diagram showing a software configuration of the information processing apparatus 101. A workflow setting application 301 is a program module that is installed to and runs on the information processing apparatus 101. When the workflow setting application 301 is to be executed, the workflow setting application 301 is loaded to the RAM 203 and is executed by the CPU 201. A UI unit 302 establishes a graphical user interface (GUI), which will be described below, and receives various input operations from a user to make an instruction to execute processing corresponding to the operations. A workflow (WF) editing unit 303 executes various kinds of editing processing for the workflow setting application (creation, editing, registration, etc. of a workflow). A workflow control unit 304 accesses workflow control data, which will be described below, and executes various kinds of control to edit a workflow. A workflow management unit 305 accesses a workflow database (DB), which will be described below, and registers a workflow created using the workflow setting application, or references information regarding a workflow that has been registered. A workflow DB 306 is a database for managing workflow information, which will be described below. The workflow DB is configured to store information in the HDD 204 of the information processing apparatus 101, but may be configured to store information in another information processing apparatus (e.g. a database server) connected thereto via a network. Workflow control data 307 is control data for workflow creation, which will be described below. A print job management application 308 is a program module that is installed to and runs on the information processing apparatus 101. The print job management application 308 receives an order to create a printed matter from a user through an ordering system (not shown), and acquires workflow information, which has been registered by the workflow setting application 301, from the workflow DB 306 to generate a print job corresponding to the order. If there is a post-processing process, the print job may include a post-processing job. Thereafter, the print job management application transmits the generated print job to the image forming apparatus 102 and the post-processing apparatus 103 as determined in advance. Note that the workflow setting application 301 and the print job management application 308 may be configured as a single application. It is also possible to employ a configuration in which the print job management application and the workflow setting application are installed to different information processing apparatuses 101.

Workflow Setting and Registration Processing

Figure 4A:
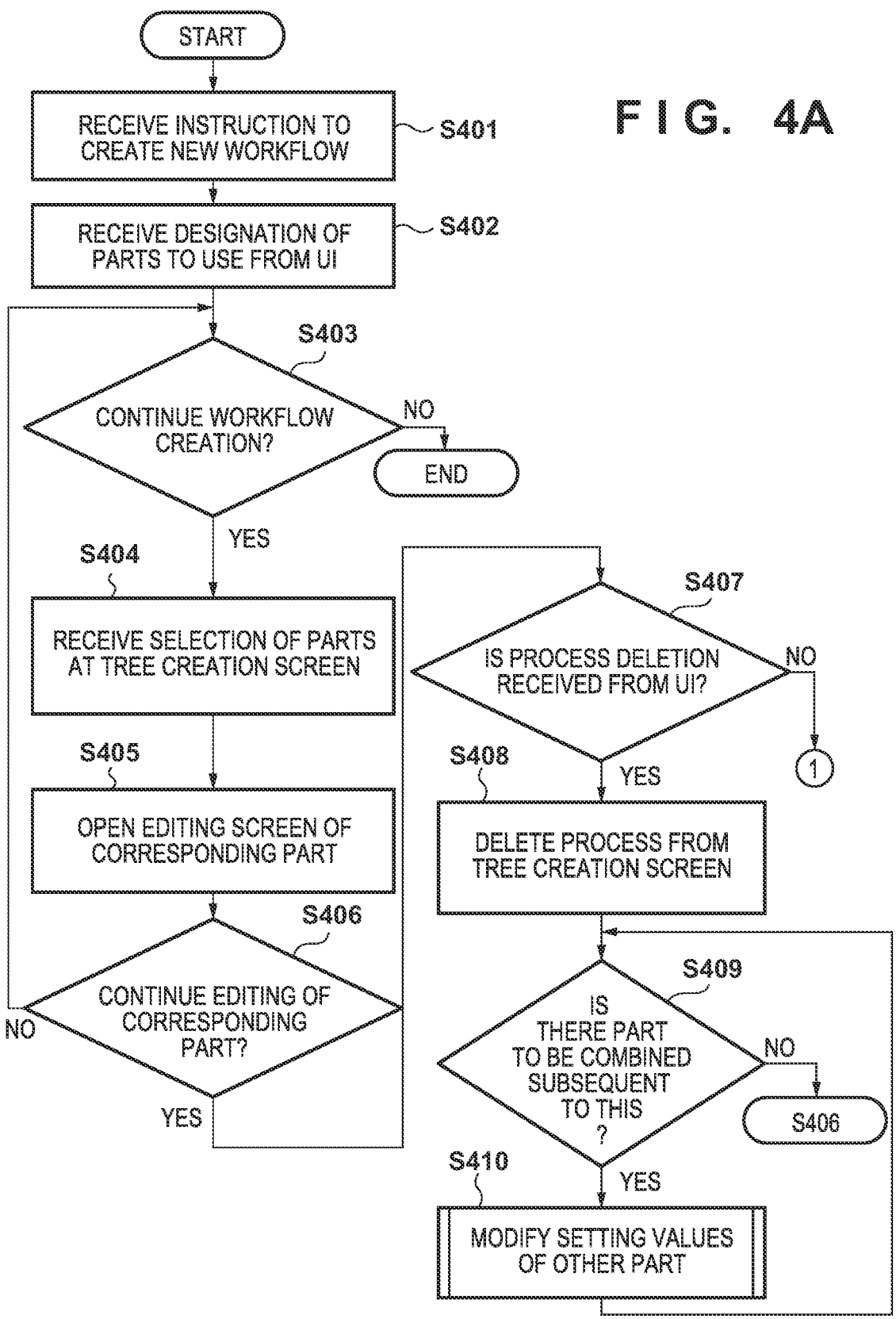
FIGS. 4A and 4B show flowcharts illustrating workflow creation processing according to the present invention.
Figure 4B:
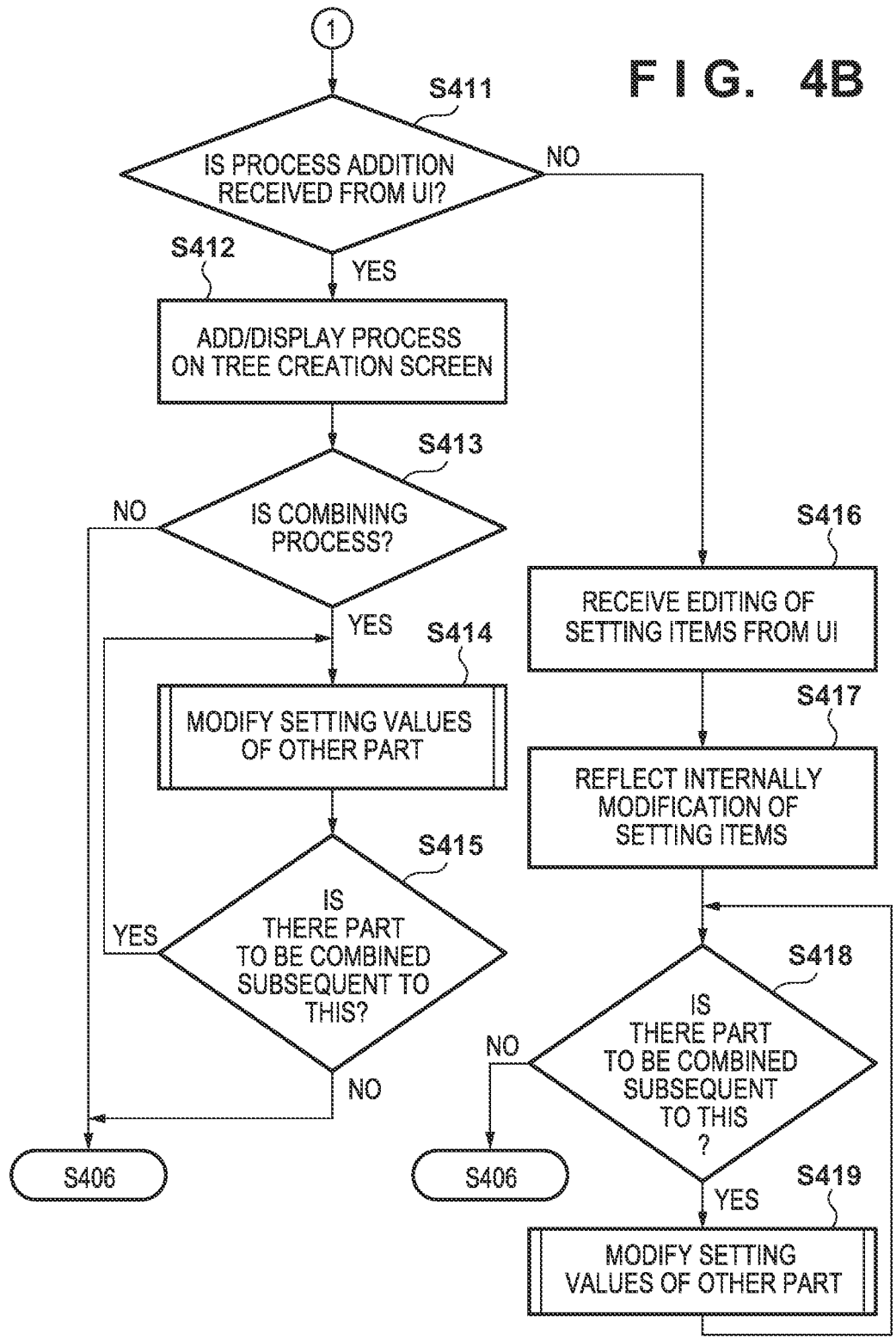

FIGS. 4A and 4B show flowcharts illustrating a workflow setting and registration processing performed by the workflow setting application. UI screens of the workflow setting application shown in FIGS. 5, 6, 7, and 8 are used to describe each processing step.

Figure 6:
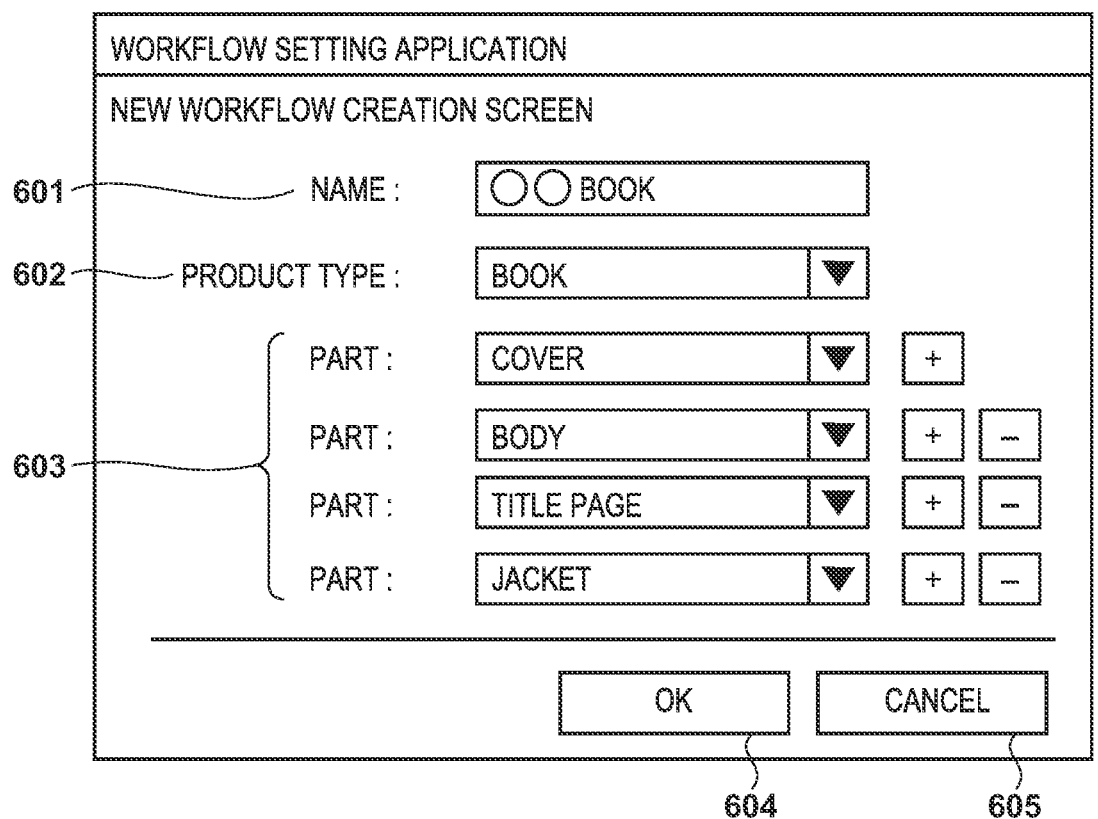
FIG. 6 is a diagram showing an example of a new workflow creation screen of the workflow setting application.
Figure 7:
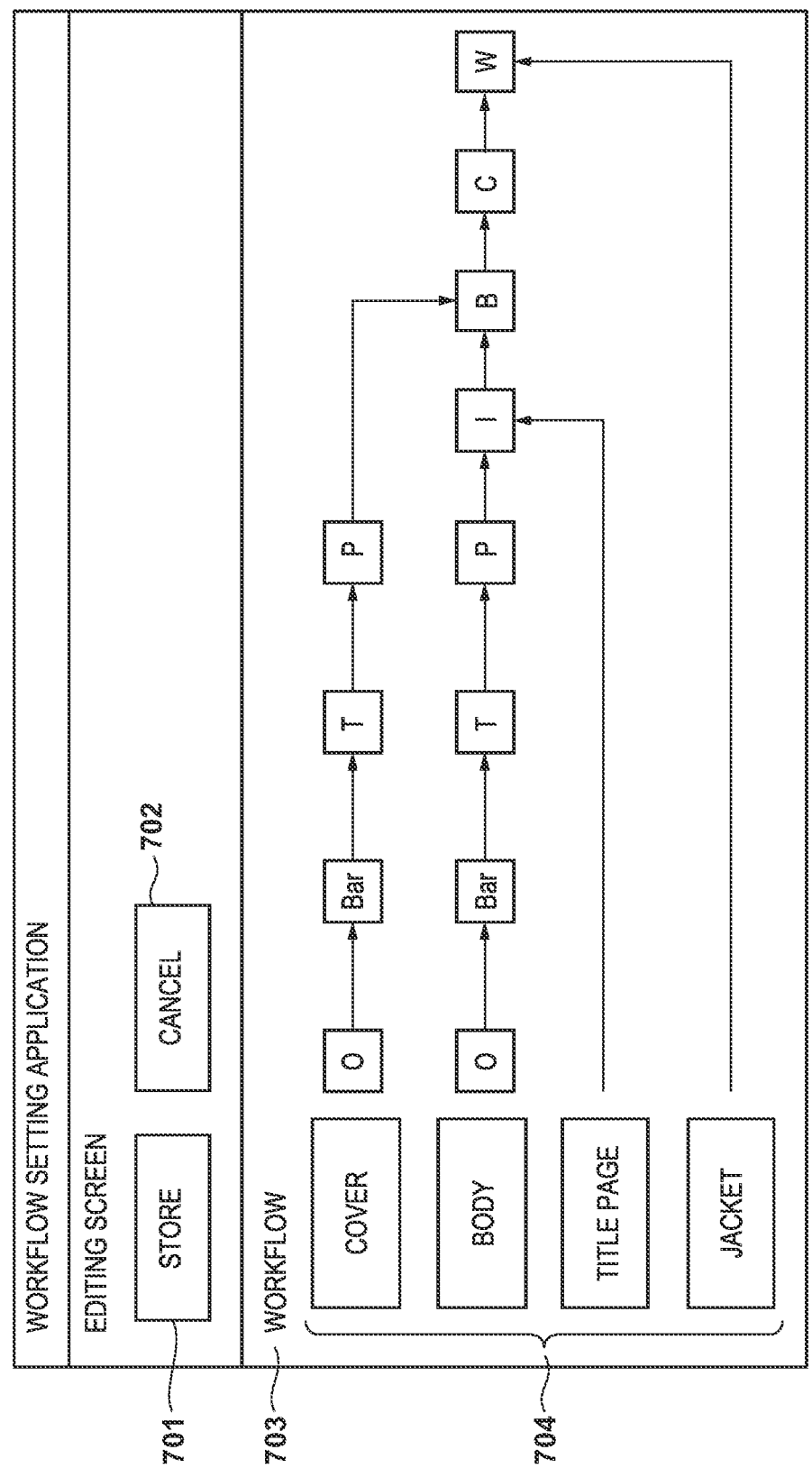
FIG. 7 is a diagram showing an example of a workflow editing screen of the workflow setting application.

Step S401 is a processing step in which the workflow setting application receives an instruction to create a new workflow and displays a new workflow creation screen. FIG. 5 shows an example of a workflow management screen of the workflow setting application 301. Upon the user making an instruction to execute the executable file of the workflow setting application 301, the workflow setting application 301 is loaded to the RAM 203, and the UI unit 302 displays the workflow management screen shown in FIG. 5 on the display 207. The workflow management screen is provided with a new workflow creation button 501, an edit button 502, a delete button 503, and a workflow list 504. The workflow list 504 shows a list of pieces of information regarding workflows that have been registered in the workflow DB 306. Upon receiving information indicating that the user has pressed the new workflow creation button 501 using the keyboard 205 or the pointing device 206, the UI unit 302 notifies the workflow editing unit 303 of the fact that an instruction to execute new workflow creation processing has been made. Thereafter, the workflow editing unit 303 displays the new workflow creation screen as shown in FIG. 6 on the display 207, using the UI unit 302. Note that operations performed when an instruction to edit an existing workflow is made is the same as those performed when a new workflow is created, except that the initial screen that reflects settings for the existing workflow is displayed. Upon an instruction to add, delete, or change various setting items being made via the user interfaces shown in FIGS. 6, 7, 8, and 12, the workflow setting application 301 performs setting change according to the instruction.

Step S402 is a processing step in which the workflow setting application 301 receives designation of parts via the new workflow creation screen. Part selection fields 603 are list boxes for setting parts of a commercial material (a product) such as a cover, a body, a title page, and a jacket. It is possible to designate a plurality of parts for the commercial material that is to be manufactured. Note that a commercial material mentioned here may be a printed matter that has undergone post-processing such as cutting and bookbinding, and examples thereof include a book and a booklet. FIG. 6 shows a state in which four parts, namely a cover, a body, a title page, and a jacket, which constitute a bound book with a jacket, have been set. The new workflow creation screen includes a name designation field 601, a commercial material type selection field 602, and part selection fields 603 for the commercial material. Upon receiving information indicating that the user has designated parts in the part selection fields 603 using the keyboard 205 or the pointing device 206, the UI unit 302 sets the designated parts. Upon receiving information indicating that an OK button 604 on the new workflow creation screen has been pressed, the UI unit 302 displays the editing screen shown in FIG. 7, and proceeds to the next processing.

Step S403 is a processing step for determining whether or not editing of the workflow has been completed. If the user stops editing the workflow by pressing a save button 701 on the editing screen shown in FIG. 7 (No in step S403), the WF management unit 305 stores the workflow information that has been edited in the WF DB 306, and terminates the processing represented by this flowchart. If the user stops editing the workflow by pressing a cancel button 702, the WF management unit 305 terminates the processing without storing the workflow information. Note that the editing screen shown in FIG. 7 includes a workflow display section 703 in addition to the save button 701 and the cancel button 702, and the workflow display section 703 includes part icons 704 that respectively indicate parts that constitute the product.

Figure 8:
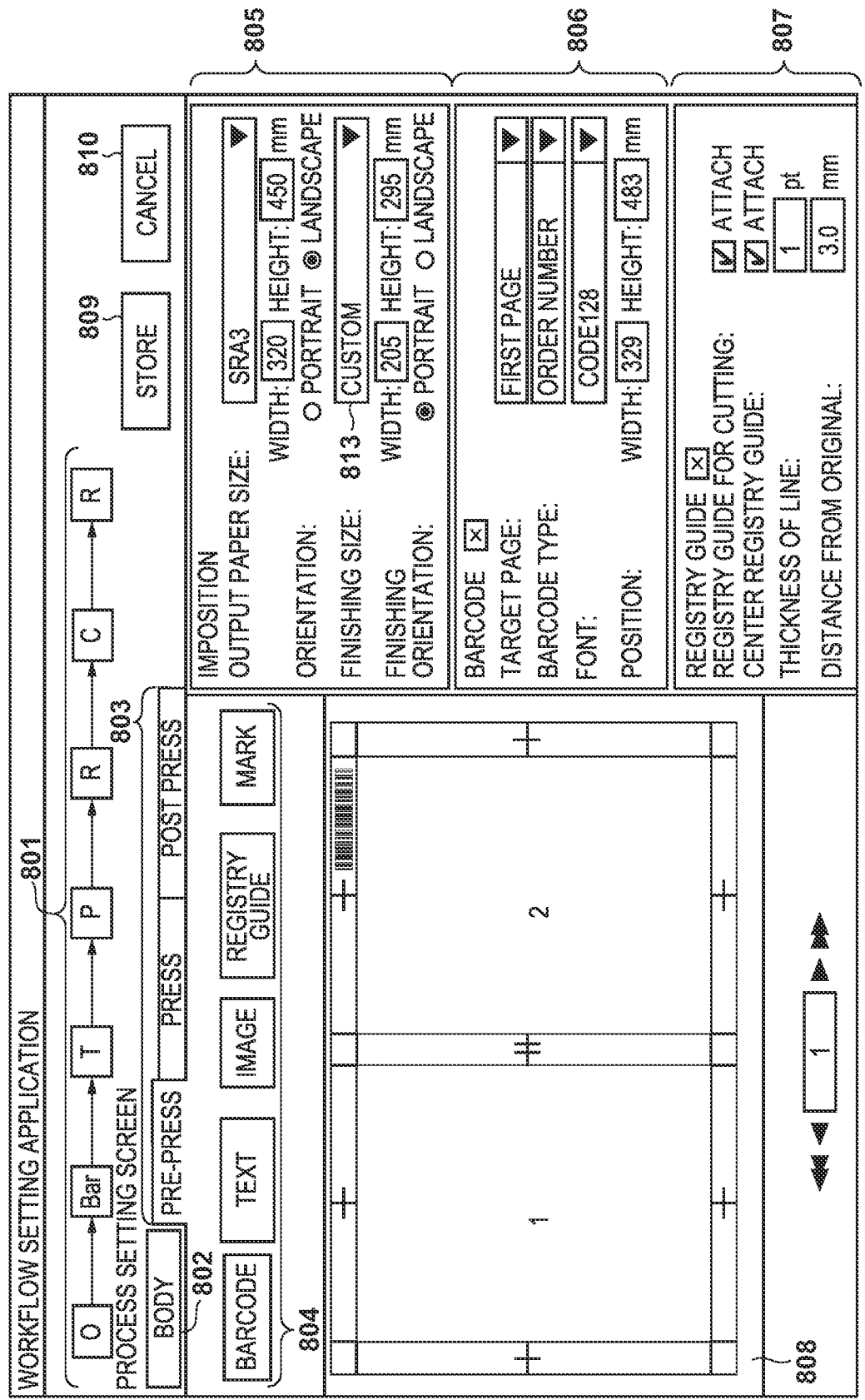
FIG. 8 is a diagram showing an example of a workflow process setting screen of the workflow setting application.

Step S404 is a processing step in which selection from among the displayed part icons is received. Upon the user clicking on one of the part icons 704, the UI unit 302 receives designation of a part. After selection of a part has been received, a workflow process setting screen corresponding to the selected part is displayed on the display 207 in step S405, using the UI unit 302. FIG. 8 is a diagram showing an example of a workflow process setting screen. A tree display area 801 shows process icons that represent a workflow that has been set for the setting-target parts. A label control 802 indicates a setting-target part. A tab control 803 is a tab control for setting processes in the categories of pre-press, press, and post-press. Pre-press is so-called pre-processing that is performed before the printing process is performed, and post-press is so-called post-processing that is performed after the printing process has been performed. For example, if the pre-press tab is selected, various setting controls for setting the processes in the pre-press category are displayed. Buttons 804 are buttons for setting various processes in the pre-press category. When the pre-press tab is displayed, buttons for setting processes that can be selectively set, such as processes corresponding to barcodes, texts, images, registry guides, other marks, and so on, are displayed. In the example in FIG. 8, barcodes and registry guides are selected as parts of the body in the pre-press category. In this example, the imposition process is regarded as an essential process that cannot be omitted, and therefore a button is not provided for this process. Of course, this process may be selectable and settable as a process in the pre-press category.

Figure 12:
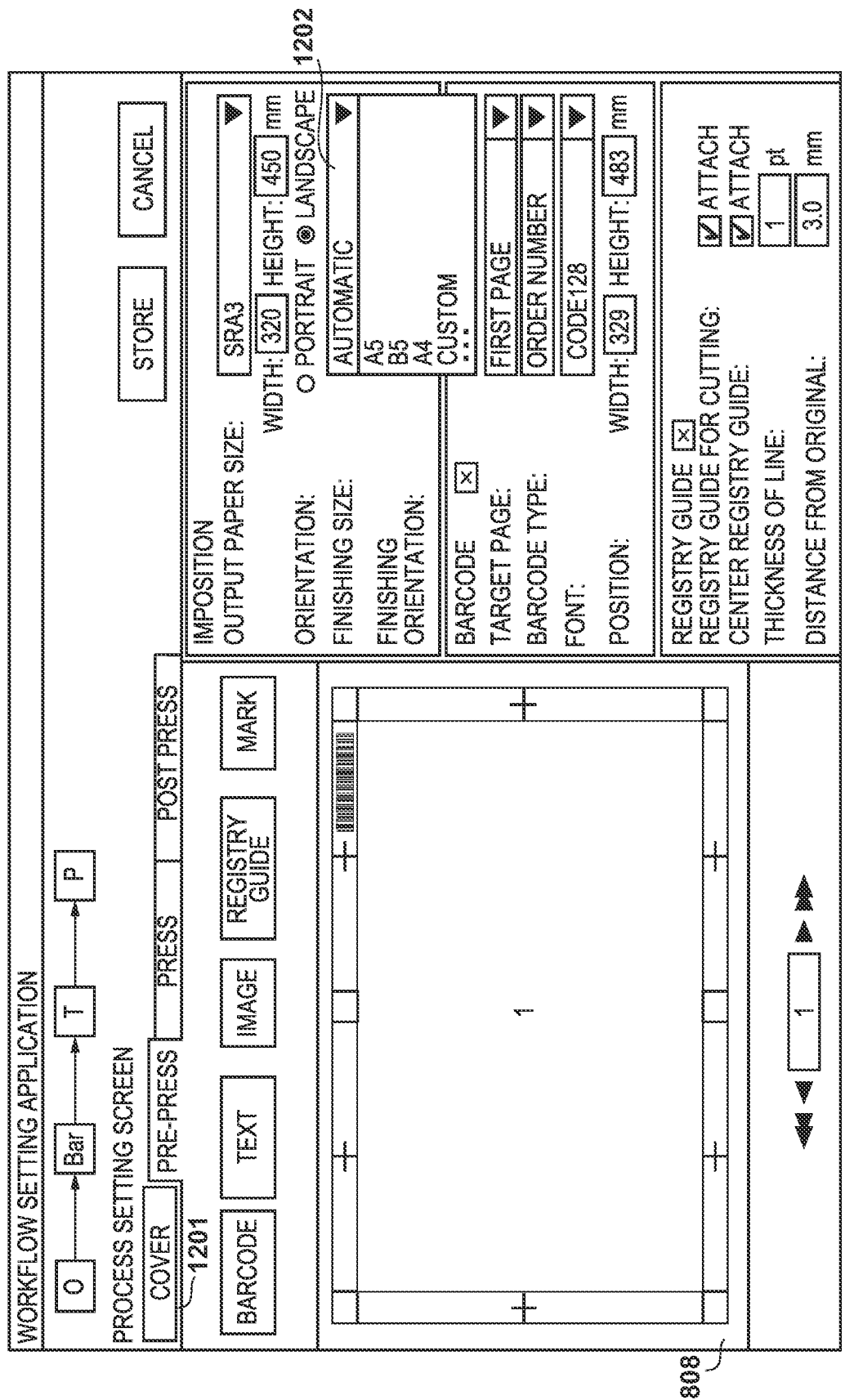
FIG. 12 is a diagram showing an example of a workflow process setting screen for a front cover, of the workflow setting application.

Setting controls 805, 806, and 807 are setting controls for determining detailed settings regarding each process. The setting control 805 is a setting control for determining detailed settings for imposition, the setting control 806 is for barcodes, and the setting control 807 is for registry guides. Here, setting controls for the essential process and the selected processes are respectively displayed. A control for setting settable parameters is displayed for each process. For example, regarding the imposition process, the output paper size and the finishing size are displayed, and regarding the barcode process, the coordinates of the position at which a barcode is to be attached and the font type are displayed. Regarding the paper size and the finishing size, in the case of a standard size, the width and the height of the sheet are displayed upon the user selecting a standard size from the pull-down menu, and in the case of a non-standard size, the user selects "custom" from the pull-down menu and manually inputs the width and the height. FIG. 12 is a diagram showing an example of a workflow process setting screen for a front cover, as can be seen from a label control 1201, which indicates "cover". A pull-down menu1202 in FIG. 12 for setting the imposition process includes an option "automatic". If the option "automatic" is selected, setting values are complemented through processing described below. A preview area 808 displays an image of the printed matter that reflects setting values that have been set from the setting controls.

Step S406 is a determination processing step for determining whether or not editing of the selected part is continuing. If the user presses a save button 809 or a cancel button 810 via the UI unit 302, the workflow editing unit 303 determines that editing of a part is to be terminated. If editing of a part has been terminated (No in step S406), the screen shown in FIG. 7 is displayed again, and the workflow setting application 301 returns to the processing in step S403. If editing of a part is continuing (Yes in step S406), the workflow setting application 301, in step S407, determines whether or not an instruction to delete a process has been received. An instruction to delete a process is received upon the user pressing a delete button (not shown), pressing a delete key in state where the icon of a process that is to be deleted has been selected, or selecting "delete" from a menu displayed by clicking the right mouse button. Upon an instruction to delete a process being received (Yes in step S407), the icon of the process is deleted from the tree display area 801 (S408).

Step S409 is a processing step for determining whether or not there is another part that is to be combined in a process that is subsequent to the deleted process. In other words, in step S409, it is determined whether or not there is a process that is subsequent to the deleted process and in which another part is to be combined. If there is another part that is to be combined, the setting values for the combined part are modified in a sub procedure S410. The details of step S410 are described with reference to FIG. 9. Note that, in the tree display area 801, a process that is "subsequent" to another process is a process located in the direction indicated by an arrow (rightward in the figure). For example, in the workflow shown in FIG. 7, if the part of interest is the body and the process of interest is a barcode process (Bar), a title page and a cover are combined with the body in two combining processes that are subsequent to the barcode process, namely insertion and bookbinding processes. In the present embodiment, "a part that is to be combined" refers to a part that is to be combined with a part that undergoes a combining process. In the present embodiment, only the body undergoes a combining process. However, of course, another part may undergo a combining process.

After the sub procedure S410 for modifying setting value for another part has been completed, the workflow setting application 301, in step S409, determines whether or not there is yet another part that is to be combined. If there is no part that is to be combined (No in step S409), the workflow setting application 301 returns to step S406 again to determine whether or not editing of a part is to be continued.

Upon determining in step S407 that an instruction other than an instruction to delete a process has been received, the workflow setting application 301 proceeds to step S411. Step S411 is a processing step in which whether or not an instruction to add a process has been received from the UI unit 302. An instruction to add a process is received upon the user selecting a necessary process using the buttons 804. If an instruction to add a process has been received (Yes in step S411), the UI unit 302 adds the process to the tree display area 801 and displays it in step S412, and, at the same time, opens setting controls 805, 806, and 807 for the added process. In step S413, the workflow setting application 301 determines whether or not the process that has been determined as the added process in step S411 is a combining process, and if the process is a combining process (Yes in step S413), the workflow setting application 301 modifies the setting values for the combined part in step S414. The sub procedure for modification is described below with reference to FIG. 9. In step S415, if there is a part to which the part of interest is combined in a process subsequent to the added process (Yes in step S415), the workflow setting application 301 returns to the sub procedure S414, and applies the same setting modification to the part. If the added process is not a combining process (No in step S413), or if there is no part that is to be combined in a process that is subsequent to the added process (No in step S415), the workflow setting application 301 returns to step S406 to determine whether or not editing of a part is to be continued.

Step S416 is a processing step in which an instruction other than an instruction to delete or add a process, i.e., an instruction to edit setting items according to an editing operation, is received from the UI. An instruction to edit setting items is received by the UI unit 302 upon the user editing the setting items in the setting controls 805, 806, and 807. In step S417, the WF editing unit 303 internally applies the modification to the setting items made by the user. Step S418 is a processing step for determining whether or not there is a part that is to be combined in a process that is subsequent to the edited process. If there is such a part (Yes), the setting values for the part are changed in step S419. Here, for example, if a finishing size 813 has been changed, the finishing size of the part is modified, and if a registry guide position has been modified, the registry guide position for the part is modified. If there is no part that is to be combined in a process that is subsequent to the edited process (No in step S418), the workflow setting application 301 returns to step S406 again to determine whether or not editing of a part is to be continued.

Modification of Setting Values for Part to be Combined

Figure 9:
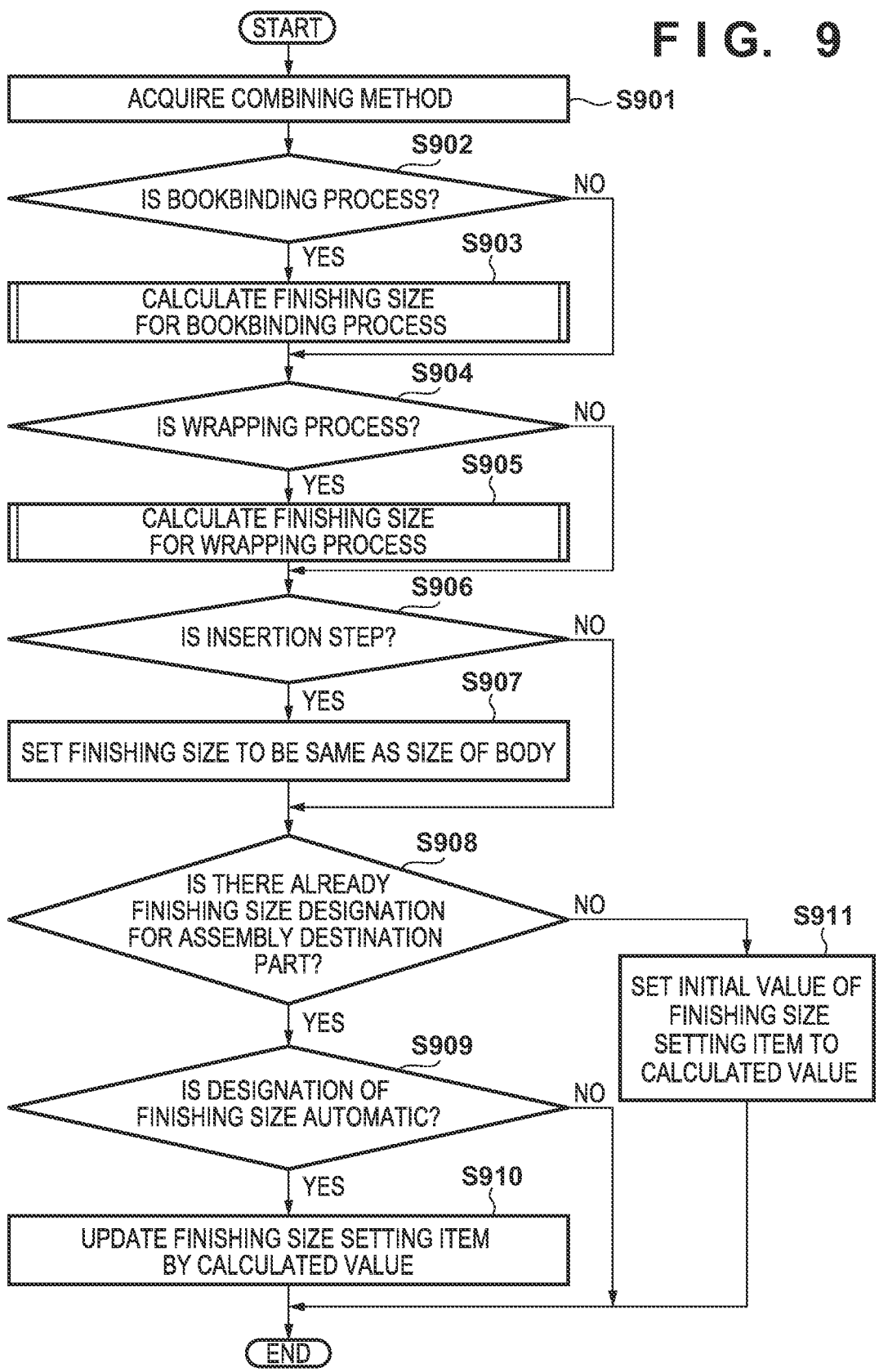
FIG. 9 is a flowchart showing processing through which setting values of other parts are modified.

FIG. 9 is a flowchart showing a method for modifying setting values, which is performed in the sub procedures S410, S414, and S419. In this flowchart, settings for the combined part, which is to be combined with the part that has been operated by the user, are modified.

In step S901, the WF editing unit 303 acquires information regarding the part operated by the user and a combining method corresponding to the part. Here, the combining process for which the combining method is to be acquired is the process that is subsequent to the operated (deleted, added, or edited) process, that has not been processed, and that is the closest to the operated process.

Steps S902 to S907 are processing steps for calculating the finishing size, which varies depending on the type of the combining method thus acquired. If the acquired combining method corresponds to a bookbinding process (Yes in step S902), a sub procedure S903 (shown in FIG. 10) is performed to calculate the finishing size for the bookbinding process, and if the acquired combining method corresponds to a wrapping process (Yes in step S904), a sub procedure S905 (shown in FIG. 11) is performed to calculate the finishing size for the wrapping process. If the acquired combining method corresponds to an insertion process (Yes in step S906), the finishing size is set to be the same as the finishing size of the body in step S907. The sizes of the parts that are to be combined in the insertion process (a title page and a slip sheet) are set to be the same as the size of the body, and thus the parts can be glued to the cover together with the body, using a bookbinding machine. Step S908 is a processing step in which whether or not a finishing size has already been set to the assembly destination part is determined. If there is a setting control that includes a finishing size (Yes in step S908), processing is performed to determine whether or not the setting value for the finishing size is "automatic" (step S909). If "automatic" has been selected from a pull-down menu 1202 as a setting regarding the finishing size (Yes in step S909), the setting regarding the finishing size is updated to the value calculated through the processing performed in steps S902 to S907. If a finishing size has not been set to the assembly destination part (No in step S908), the initial value for the finishing size is updated to the calculated value (step S911). The updated initial value is displayed in an input field upon the user displaying a setting control later.

Figure 10:
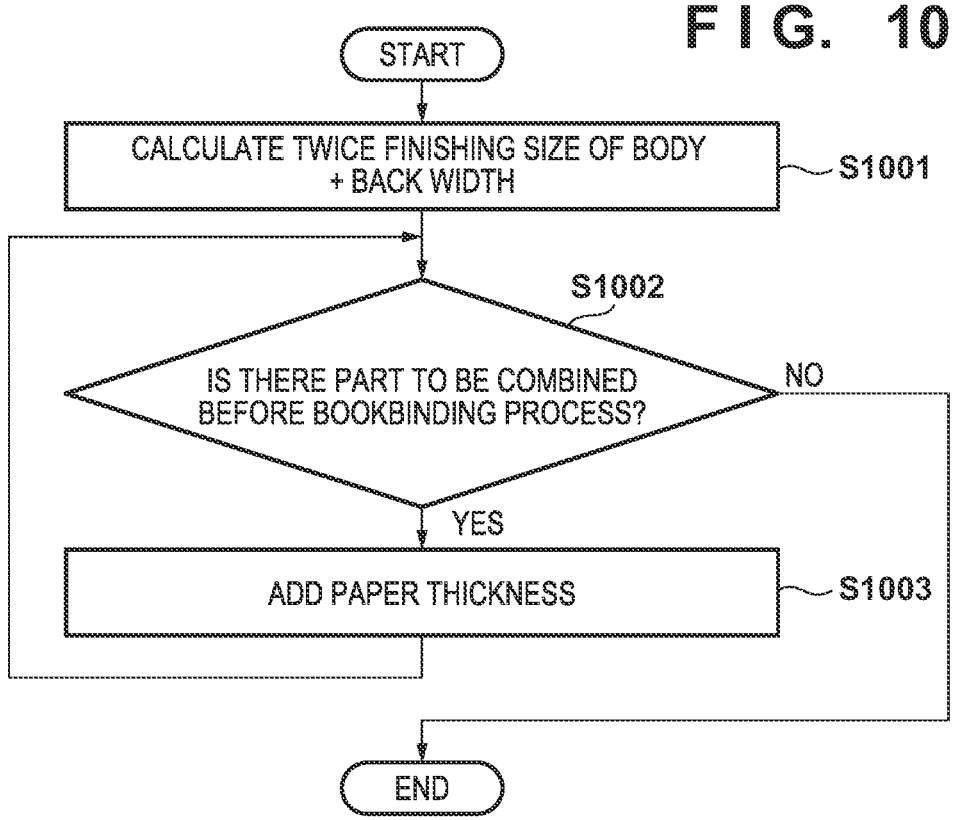
FIG. 10 is a flowchart showing finishing size calculation processing for a bookbinding process.

FIG. 10 is a flowchart showing the sub procedure performed in step S903 to calculate a finishing size for a bookbinding process. A part that is to be combined with the body in the bookbinding process is a cover, for example, and the finishing size of the cover is to be calculated. In step S1001, a size is calculated by adding the back width of the body to twice the finishing size of the body. As a result of the calculation performed through this processing, the paper size of the cover is the same as the size for wrapping the printed body. If there is a part that is to be combined in a process before the bookbinding process for the body is performed (Yes in step S1002), the paper thickness of the part to be combined is added (step S1003). If a title page or a slip sheet is attached to the body, the size of the trimmed cover is insufficient. However, due to the processing in step S1003 being performed, the paper size of the cover is changed to a paper size that is sufficient to wrap the body including the title page and the slip sheet. If there is no other part that is to be combined in a process before the bookbinding process is performed (No in step S1002), the processing shown in this flowchart is terminated. Through this procedure, if a process to be added or deleted is a combining process, for example, adjustment is performed with respect to the thickness of the part that is to be newly combined or to be decombined.

Figure 11:
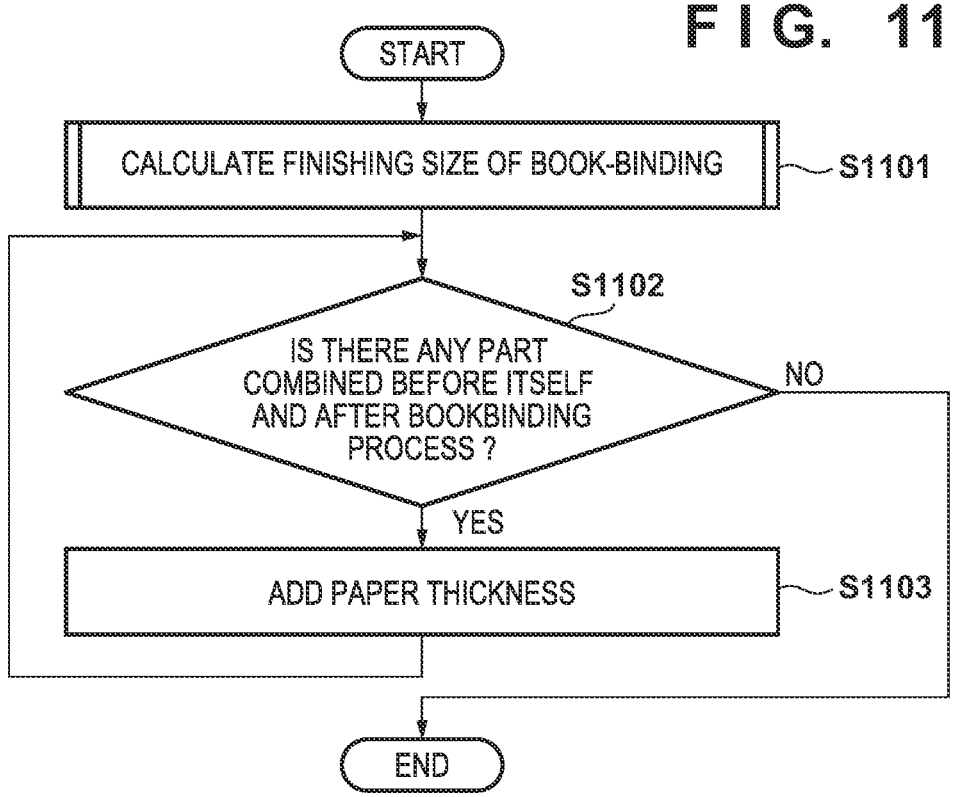
FIG. 11 is a flowchart showing finishing size calculation processing for a wrapping process.

FIG. 11 is a flowchart showing the sub procedure performed in step S905 to calculate a finishing size for a wrapping process. A part that is to be combined with the body in the wrapping process is a jacket, for example, and the finishing size of the jacket is to be calculated. In step S1101, the finishing size of the cover is acquired as the external size of a bound book. The finishing size of the cover is calculated through the sub procedure shown in FIG. 10. If there is a part that is to be combined after the bookbinding process for the body has been performed and that is to be combined in the wrapping process before the aforementioned part is combined (Yes in step S1102), the paper thickness of the part to be combined is added (step S1103). Through this processing, when the finishing size of the wrapper band is to be calculated, the paper thickness of the jacket can be taken into consideration, and a paper size can be calculated such that the wrapper band will be long enough to wrap the cover and the jacket. If there is no part that is to be combined after the bookbinding process has been performed and that is to be combined in the wrapping process before the aforementioned part is combined (No in step S1102), processing is terminated. Through this procedure, if a process to be added or deleted is a combining process, for example, adjustment is performed with respect to the thickness of the part that is to be newly combined or to be decombined.

Through the above-described procedures, it is possible to create a print workflow, and furthermore, it is possible to edit the workflow. During these procedures, if a process for a part such as the body is deleted, added, or changed, for example, the settings for other parts that are to be combined with the body, such as the sizes thereof, are accordingly adjusted.

Figure 13:
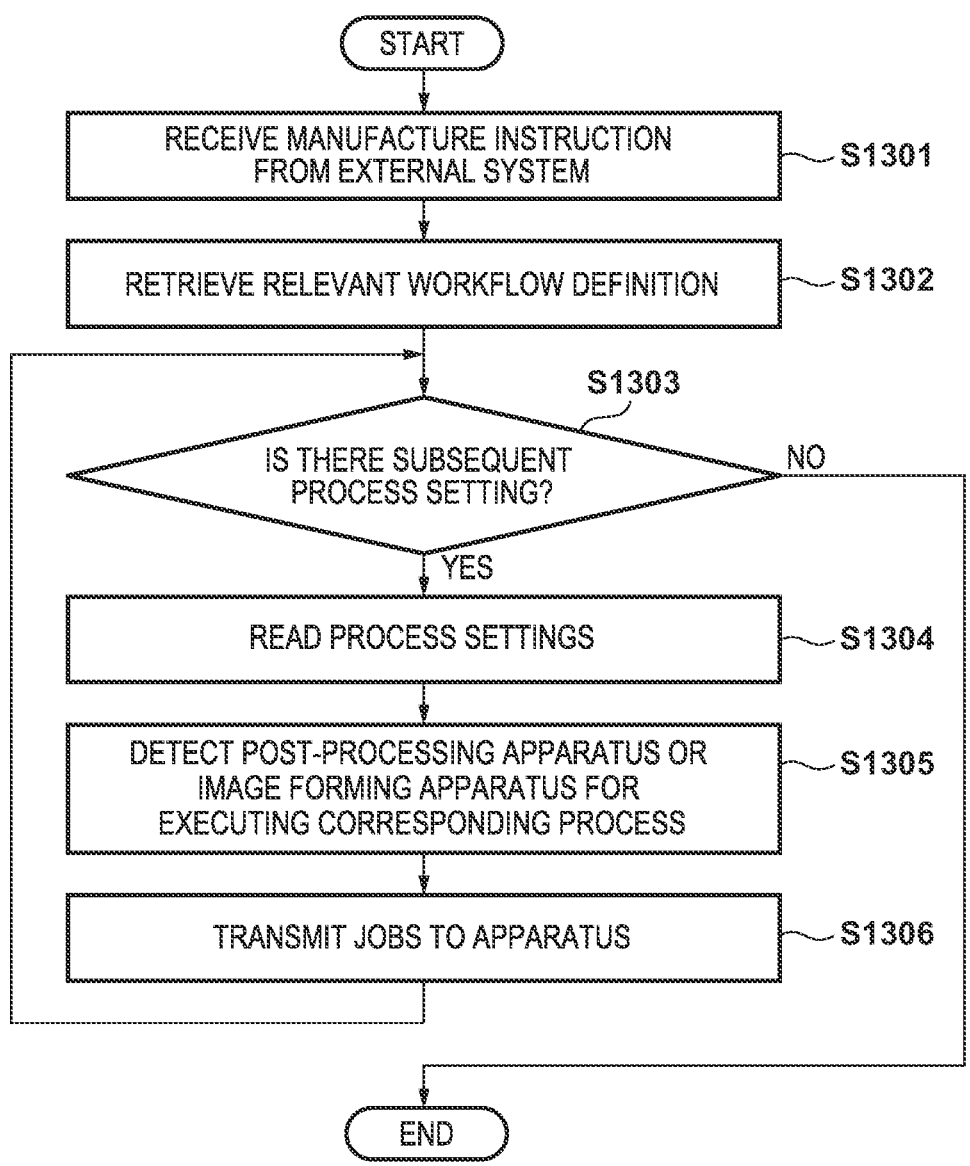
FIG. 13 is a flowchart showing a manufacturing process instruction processing for which a workflow is used.

Processing Procedures for Instructing Image Forming Apparatus and Post-processing Apparatus to Manufacture Product FIG. 13 is a flowchart showing processing for instructing the image forming apparatus 102 and the post-processing apparatus 103 to manufacture a product, using the workflow created through the processing shown in FIGS. 4A and 4B. In the system according to the present embodiment, a workflow is defined before an order of a product is received. Upon receiving an order, the system transmits an instruction to manufacture the product, to the image forming apparatus and the post-processing apparatus connected thereto, based on the defined workflow for the product.

In step S1301, workflow creation software receives an instruction to manufacture a book from the outside of the system via a network. Network communication using a HTTP protocol or the like is employed to provide the workflow creation software with an instruction to manufacture a book, and the instruction is described using a file format such as CSV (comma-separated values). An instruction includes an ID that specifies the commercial material and the number of copies to be printed of the commercial material. Also, an instruction to manufacture a book may be made using means for registering information that a person in charge has received via telephone, e-mail, etc., using a user I/F of the software, provided that the commercial material and the number of copies to be printed can be specified.

The workflow creation software retrieves the definition of the relevant workflow (step S1302), and reads settings for each of the processes included in the definition of the workflow (Yes in step S1303, and step S1304). The definition of a workflow thus retrieved is that of the workflow edited through the procedure shown in FIGS. 4A and 4B. In step S1305, the image forming apparatus 102 or the post-processing apparatus 103 that follows an instruction is detected based on the settings of the processes thus read. Such an apparatus is detected based on the content of the process, through a search for an apparatus that has an ability corresponding to the process. The IP addresses and the port numbers of the image forming apparatus 102 and the post-processing apparatus 103 may be registered in the settings in advance when the processes are set, or apparatuses may be respectively associated with the names of the processes such that an apparatus can be uniquely specified, e.g. a bookbinding machine may be associated with the bookbinding process, and a book trimming machine may be associated with the book trimming process. The user may select an apparatus that performs processing, using a user I/F.

In step S1306, a manufacture instruction (also referred to as a job) that includes the content of settings for processes is transmitted to the apparatus detected in step S1305. If a product is constituted by a plurality of parts, a job is generated for each part and each process, and such jobs are transmitted to the apparatuses corresponding thereto. For example, in the case of the workflow shown in FIG. 8, for the body, a print job is generated to apply, to the document data of the subject to be printed, information regarding imposition, barcodes, and registry guides, which are to be provided through processes in the pre-press category, and insert a title page from an inserter, and such a print job is transmitted to the image forming apparatus 102. Also, a post-processing job is generated to bind sheets of paper, the number of which is based on the number of pages of the document to be printed and the number of title pages that have been inserted, using a cover that has been separately printed. Such a job is transmitted to a post-processing apparatus 103 that has a bookbinding function. Furthermore, a post-processing job for book trimming is transmitted to a post-processing apparatus that has a book trimming function, a job for wrapping a book that has undergone book trimming with a jacket that has been separately prepared, and such a job is transmitted to a post-processing apparatus that has a wrapping function. Jobs are transmitted in a format such as the JDF (Job Definition Format) via a network, using a network protocol such as the HTTP. The format and the protocol are not limited to the JDF or the HTTP, provided that the settings determined through definition of the workflow can be realized by the apparatuses. If job transmission is complete regarding all of the processes defined by the workflow (No in S1303), processing is terminated.

In the present embodiment, if an optional pre-press process related to registry guides, barcodes, images, or other marks of the body is deleted in step S412 of FIG. 4B, for example, a process corresponding to the deleted process may be removed from the processes for other parts to be combined, such as a cover and a title page. If an optional pre-press process related to registry guides, barcodes, images, or other marks of the body is added in step S408 of FIG. 4A, for example, a process corresponding to the added process may be added to the processes for other parts to be combined, such as a cover and a title page. Note that, when a process for registry guides is to be added, parameters may be set as described in the second embodiment below, and when a process for barcodes is to be added, parameters may be set as described in the third embodiment below.

Also, deletion and addition for categories other than the pre-process category may be performed in the same manner. However, regarding a printing process, a part to be combined may be separately prepared, and therefore, a printing process for other parts need not be adjusted according to a change such as addition or deletion of a printing process for the body.

Furthermore, deletion and addition of the corresponding process for other parts need not be unconditionally performed. Instead, an optional setting for synchronizing the corresponding process may be accepted, and only if such a setting for synchronization has been made, adjustment may be performed such that a change, addition, or deletion of a process for the body may be synchronously applied to parts to be combined.

As described above, in the present embodiment, if a process related to a part is changed, such a change in settings is applied to other parts that are to be combined in a combining process that is subsequent to the changed process. In particular, if such a combining process is a bookbinding process or a wrapping process, it is possible to automatically apply a change in the thickness resulting from deletion, addition, or change of a process, to the finishing sizes of other parts that are to be combined in the combining process. If such a combining process is an insertion process, it is possible to automatically apply a change in the finishing size resulting from deletion, addition, or change of a process, to the finishing sizes of other parts that are to be combined in the combining process.

Second Embodiment

The following describes the second embodiment of the present invention. In the second and third embodiments, descriptions of the same components as in the first embodiment are omitted as appropriate. In the second embodiment, two-side imposition is set regarding the body, and when a registry guide is set in the center, the positions of registry guides for other parts are corrected according to the position of the registry guide set by the user.

If the position of the registry guide in the center has been set using a setting control, registry guides of a part that is to be combined in the insertion process (a title page) are set at the same positions as the registry guides on one side of the body that has undergone two-side imposition. If the positions of registry guides of the body are changed, the setting values for the positions of the registry guides of the title page are also changed according to the change.

Regarding a part that is to be combined in the bookbinding process (a cover), the positions of the registry guides thereof are set so as to correspond to a width obtained by subtracting the width of the registry guides of the body from the above-described paper size obtained by adding the back width to twice the trim size of the body. If the positions of the registry guides of the body are moved outward, processing is performed to move the positions of the registry guides of the cover inward. Thus, in the case where the finishing paper size of the body becomes small as a result of a milling process through which a relatively large portion is cut, the paper size of the cover is prevented from being unnecessarily large. Regarding a part that is to be combined in a wrapping process (a jacket), processing is performed to move the registry guides inward in the same direction and by the same length as those of the cover. If the registry guides of the body are set to be moved inward, processing is performed such that the registry guides of a part that is to be combined in the bookbinding process (a cover) and registry guides of a part that is to be combined in the wrapping process (a jacket) are moved outward.

Third Embodiment

In the third embodiment, in binding of a book constituted by a body part and a cover part, when a barcode for controlling a bookbinding machine is set for the body, the position of the barcode of the cover is modified according the position of the barcode set by the user.

When coordinates of a barcode located in the margin of the body are set by a user using the setting control, regarding a part that is to be combined in the bookbinding process (a cover), a barcode for controlling a binding machine is set at the same position relative to the position of the origin at a corner of the paper. If the position of the barcode of the body is changed, the position of the barcode of the cover is changed to the same position.

As described above, according to the above embodiments, an operator does not need to calculate and input each setting value for a plurality of parts when setting a print workflow. Thus, when an operator sets a workflow, it is possible to reduce a load on the operator, improve a work efficiency, and prevent a mistake from occurring. That is to say, it is possible to realize workflow setting with which it is possible to improve a work efficiency and prevent a mistake from occurring.

Although the finishing size, the positions of registry guides, and the coordinate positions of barcodes are described above as examples, the present invention is also applicable to other print settings (e.g. a paper size). The configuration and the content of each of the above-described various GUIs are not limited to them, and may be modified with various configurations and contents according to the use and the purpose.

Although an aspect of the present invention is described above, the present invention may be realized in various modes e.g., as a system, an apparatus, a method, a program, or a recording medium. Specifically, the present invention may be applied to a system that is constituted by a plurality of devices, or an apparatus that is constituted by one device. In addition, a configuration formed by combining the above-described embodiments with each other is also included in the present invention.

The present invention may be applied to a system that is constituted by a plurality of devices, or an apparatus that is constituted by one device.

The present invention is not limited to the above-described embodiments. The embodiments may be variously modified based on the spirit of the present invention (the present invention include organic combinations of the embodiments), and such modifications are not excluded from the scope of the present invention. That is to say, all of the combinations of the above-described embodiments and modifications thereof are included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-169976, filed Sep. 11, 2018 which is hereby incorporated by reference herein in its entirety.

What is claimed is:

1. An information processing apparatus comprising:
 a setting unit configured to set a setting value of a first print part of a print product among a plurality of parts of which the print product consists;
 a determination unit configured to determine whether a second print part to be combined with the first print part is included in the plurality of parts in order to create the print product;
 a change unit configured to change a setting value of the second print part to be combined with the first print part according to the setting value of the first print part in a case where it is determined by the determination unit that the second print part to be combined with the first print part is included in the plurality of parts in order to create the print product; and
 a user interface unit for a user operation,
 wherein the user interface unit displays the setting values, and
 when the setting value of the second print part is to be displayed by the user interface unit after the setting value of the first print part has been changed, the setting value of the second print part changed by the change unit is displayed by the user interface unit.

2. The information processing apparatus according to claim 1,
wherein the setting value of the first print part includes settings for process steps for the first print part, and the process steps include a combining process in which the second print part is combined with the first print part, and
the change unit changes the setting value of the second print part that is to be combined with the first print part in the combining process that is subsequent to the process steps in which the setting value of the first print part has been changed.

3. The information processing apparatus according to claim 2,
wherein an edit that can be made to the process steps of the first print part includes deletion of a process step, and
upon a process step being deleted from the process steps of the first print part, the change unit changes the setting value of the second print part that is to be combined with the first print part in the combining process that is subsequent to the deleted process step.

4. The information processing apparatus according to claim 3,
wherein, if the deleted process step is a combining process, the thickness of the second print part that is to be combined with the first print part in the combining process is changed as the setting value of the second print part.

5. The information processing apparatus according to claim 3,
wherein, if the deleted process step is a pre-processing process that is performed before a printing process is performed, the change unit deletes a pre-processing process corresponding to the deleted pre-processing process included in the setting value of the second print part.

6. The information processing apparatus according to claim 2,
wherein an edit that can be made to the process steps of the first print part includes addition of a process step, and
upon a process step being added to the process steps of the first print part, the change unit changes the setting value of the second print part that is to be combined with the first print part in the combining process that is subsequent to the added process step.

7. The information processing apparatus according to claim 6,
wherein, if the added process step is a combining process, the thickness of the second print part that is to be combined with the first print part in the combining process is changed as the setting value of the second print part.

8. The information processing apparatus according to claim 6,
wherein, if the added process step is a pre-processing process that is performed before a printing process is performed, the change unit adds a pre-processing process corresponding to the added pre-processing process included in the second print part.

9. The information processing apparatus according to claim 2,
wherein an edit that can be made to the setting value of the first print part includes a change of the setting value of the finishing size in a process step of the first print part, and
upon the setting value of the finishing size in the process step of the first print part being changed, the change unit changes the finishing size of the second print part that is to be combined with the first print part in the combining process that is subsequent to the changed process step.

10. The information processing apparatus according to claim 9,
wherein, if the finishing size has been set so as to be automatically changed, the change unit changes the finishing size of the second print part.

11. The information processing apparatus according to claim 2,
wherein an edit that can be made to the setting value of the first print part includes a change of the setting value of the position of a registry guide that is to be printed in a process step of the first print part, and
upon the setting value of the position of a registry guide being changed, the change unit changes the setting value of the position of a registry guide of the second print part that is to be combined with the first print part in the combining process that is subsequent to the changed process step.

12. The information processing apparatus according to claim 2,
wherein an edit that can be made to the setting value of the first print part includes a change of the setting of the position of a barcode that is to be printed in a process step of the first print part, and
upon the setting value of the position of a barcode included in the first print part being changed, the change unit changes the setting value of a position of a barcode of the second print part that is to be combined with the first print part in the combining process that is subsequent to the changed process step.

13. A workflow editing method, the workflow editing method comprising:
setting a setting value of a first print part of a print product among a plurality of parts of which the print product consists;
determining whether a second print part to be combined with the first print part is included in the plurality of parts in order to create the print product;
changing a setting value of the second print part to be combined with the first print part according to the setting value of the first print part in a case where it is determined in the determining that the second print part to be combined with the first print part is included in the plurality of parts in order to create the print product; and
displaying the setting values by a user interface unit,
wherein when the setting value of the second print part is to be displayed by the user interface unit after the setting value of the first print part has been changed, the setting value of the second print part changed by the changing is displayed by the user interface unit.

14. A non-transitory computer-readable storage medium in which a program is stored, the program causing a computer to execute a workflow editing method, the workflow editing method comprising:
setting a setting value of a first print part of a print product among a plurality of parts of which the print product consists;
determining whether a second print part to be combined with the first print part is included in the plurality of parts in order to create the print product;

changing a setting value of the second print part to be combined with the first print part according to the setting value of the first print part in a case where it is determined in the determining that the second print part to be combined with the first print part is included in the plurality of parts in order to create the print product; and displaying the setting values by a user interface unit, wherein when the setting value of the second print part is to be displayed by the user interface unit after the setting value of the first print part has been changed, the setting value of the second print part changed by the changing is displayed by the user interface unit.

\* \* \* \* \*